(12) United States Patent
Pan et al.

(10) Patent No.: US 12,249,337 B2
(45) Date of Patent: Mar. 11, 2025

(54) SYSTEMS AND METHODS FOR CONTINUOUS, ACTIVE, AND NON-INTRUSIVE USER AUTHENTICATION

(71) Applicant: University of Houston System, Houston, TX (US)

(72) Inventors: Miao Pan, Houston, TX (US); Chenpei Huang, Houston, TX (US)

(73) Assignee: University of Houston System, Houston, TX (US)

( * ) Notice: Subject to any disclaimer, the term of this patent is extended or adjusted under 35 U.S.C. 154(b) by 184 days.

(21) Appl. No.: 18/180,285

(22) Filed: Mar. 8, 2023

(65) Prior Publication Data

US 2023/0291563 A1 Sep. 14, 2023

Related U.S. Application Data

(60) Provisional application No. 63/380,229, filed on Oct. 19, 2022, provisional application No. 63/268,999, (Continued)

(51) Int. Cl.
*H04L 9/14* (2006.01)
*G06F 21/32* (2013.01)
(Continued)

(52) U.S. Cl.
CPC .............. *G10L 17/04* (2013.01); *G06F 21/32* (2013.01); *G10L 17/02* (2013.01); *G10L 17/26* (2013.01);
(Continued)

(58) Field of Classification Search
None
See application file for complete search history.

(56) References Cited

U.S. PATENT DOCUMENTS 9,277,334 B1 * 3/2016 Wong ................... H04R 1/1041
11,128,636 B1 9/2021 Jorasch et al.
(Continued)

OTHER PUBLICATIONS

International Search Report and Written Opinion for international application No. PCT/US2023/063906 mailed Jul. 21, 2023.

*Primary Examiner* — Cai Y Chen
(74) *Attorney, Agent, or Firm* — Womble Bond Dickinson (US LLP

(57) ABSTRACT

Provided here are systems and method for non-intrusive authentication of a user. Such systems and methods may include in an embodiment a waveform generator to generate a message, encrypt the message, and transmit the encrypted message to one or more transmitters. The system may include a decryption engine to receive a bone conduction signal from one or more receivers, process the bone conduction signal, decrypt the processed bone conduction signal, and separate a bone conduction token portion from the decrypted bone conduction signal. The system may include an authentication engine to analyze the bone conduction signal, authenticate a user for the operation detected based on a comparison of the analyzed bone conduction signal and the pilot portion of the message exceeding a preselected threshold, and verify bone conduction signal authenticity via the bone conduction token portion and the token portion.

36 Claims, 10 Drawing Sheets

Related U.S. Application Data filed on Mar. 8, 2022, provisional application No. 63/269,001, filed on Mar. 8, 2022.

(51) Int. Cl.
  *G10L 17/02* (2013.01)
  *G10L 17/04* (2013.01)
  *G10L 17/26* (2013.01)
  *G10L 21/0208* (2013.01)
  *H04L 9/08* (2006.01)
  *H04L 9/32* (2006.01)
  *H04M 1/72463* (2021.01)
  *H04R 1/10* (2006.01)

(52) U.S. Cl.
  CPC .......... *G10L 21/0208* (2013.01); *H04L 9/085* (2013.01); *H04L 9/14* (2013.01); *H04L 9/3213* (2013.01); *H04M 1/724631* (2022.02); *H04R 1/1041* (2013.01); *H04R 2460/13* (2013.01)

(56) References Cited

U.S. PATENT DOCUMENTS

2006/0236121 A1* 10/2006 Jones ................ H04K 1/00
  713/186
2010/0310084 A1* 12/2010 Hersbach ............ H04R 25/453
  381/71.6
2018/0234244 A1   8/2018 Starner et al.

* cited by examiner

SYSTEMS AND METHODS FOR CONTINUOUS, ACTIVE, AND NON-INTRUSIVE USER AUTHENTICATION

CROSS REFERENCE TO RELATED APPLICATIONS

This application is related to U.S. Provisional Application No. 63/268,999, filed Mar. 8, 2022, titled "SYSTEMS AND APPARATUS FOR MULTIFACTOR AUTHENTICATION USING BONE CONDUCTION AND AUDIO SIGNALS," U.S. Provisional Application No. 63/269,001, filed Mar. 8, 2022, titled "METHOD FOR MULTIFACTOR AUTHENTICATION USING BONE CONDUCTION AND AUDIO SIGNALS," and U.S. Provisional Application No. 63/380,229, filed Oct. 19, 2022, titled "SYSTEMS AND METHODS FOR CONTINUOUS, ACTIVE, AND NON-INTRUSIVE USER AUTHENTICATION," the disclosures of which are incorporated herein by reference in their entirety.

TECHNICAL FIELD

The disclosure relates to methods and systems for non-intrusive, substantially continuous, and/or active authentication of a user. More specifically, the methods and systems use a bone conduction signal from a wearable device to authenticate a user of the wearable device without intervention and/or interaction by the user.

BACKGROUND

Smart voice assistants or smart devices typically include a vocal or audio based authentication process, if any authentication at all. For example, a user may speak a specific phrase or statement and the smart device may recognize the user based on the unique audio characteristics of the user's vocals when speaking the specific phrase. Such audio characteristics are usually determined during an enrollment or initialization period. Further, a user typically initiates such authentication and has to provide some manner of input (for example, speaking a phrase and/or using some other biometric or text-based input). However, a user's submission during enrollment or initialization may not match a current attempt to authenticate due to differences in tone and volume, thus resulting in a mismatch or denial of access to the smart device. Further, a third party may spoof or copy a user's audio signal and utilize such a spoof or copy of the audio signal to imitate the user, thus gaining access to, potentially, sensitive and/or private user data or information.

SUMMARY

Accordingly, Applicants have recognized a need for systems and methods to utilize an encrypted signal transmitted to a user's wearable device and transmitted via the wearable device to a receiver of the wearable device as a bone conduction signal to enable user access to a wearable device without user intrusion, interaction, and/or intervention, such systems and methods additionally providing substantially continuous and/or on-demand authentication. The present disclosure is directed to embodiments of such systems and methods.

The present disclosure is generally directed to systems and methods for using or utilizing a bone conduction signal for device authentication of a user non-intrusively. Such a system and method may include a computing device in signal communication with the wearable device. The computing device may include a waveform generator and/or instructions to generate a signal. The signal may include different messages or portions, such as a pilot portion, to indicate authenticity of a user (for example, based on a signature specific to a user's bone conduction pathway), and a token portion, to indicate authenticity of the signal (for example, to prevent authentication of tampered with or otherwise altered signals). The waveform generator and/or instructions may be configured to encrypt the message using one or more different encryption algorithms or instructions. For example, the computing device (such as, the waveform generator and/or instructions) may utilize a Rivest-Shamir-Adleman (RSA) algorithm to encrypt the signal. In other words, the computing device may encrypt the message using a public key and may decrypt a later received signal, as will be described below, using a privately shared key. In another embodiment, the wearable device may decrypt the message with the privately shared key. In yet another embodiment, other encryption algorithms or systems may be utilized, such as using a one-time key, a Diffie-Hellman key exchange, and/or other encryption algorithm or system as will be understood by one skilled in the art.

After the computing device encrypts the message, the message may be sent to the wearable device and/or a transmitter of the wearable device. The transmitter may include a speaker, bone conduction speaker, and/or other transmitter configured to transmit a signal as a bone conduction signal. The transmitter may be configured to transmit the encrypted signal as a bone conduction signal. The bone conduction signal may be transmitted as an inaudible, unnoticeable, or just noticeable signal. For example, the bone conduction signal may be transmitted at a frequency inaudible to humans, such as ultra-low and/or ultra-high frequencies (such as, from about 16 kHz to about 48 kHz, from about 20 Hz to about 200 Hz, or at about ultrasound frequencies). In another embodiment, the bone conduction signal may be transmitted as a short-period acoustic signal patch to audible frequencies to achieve the non-intrusiveness. For example, time-frequency patterns with limited duration and bandwidth (such as, a short-duration-narrow-bandwidth time-frequency pattern), or smaller signals masked by a larger amplitude signal, even at audible frequencies (such as, via a psychoacoustic masking effect), may be utilized. Further, the transmitter may vary the frequency of the bone conduction signal each time an authentication request is received. In other words, each time the transmitter receives an encrypted signal, the transmitter may choose a different frequency from the last frequency used. Further still, the wearable device may include a plurality of transmitters. In such an embodiment, the each of the plurality of transmitters may choose different frequencies at which to transmit the bone conduction signal.

The wearable device may also include a receiver or a plurality of receivers. Each receiver may be located at an opposite end of a bone conduction pathway (for example, the receiver is positioned near a contralateral ear, while the transmitter is positioned near an ipsilateral ear) and/or proximal to the transmitter. Once the transmitter transmits the bone conduction signal, the bone conduction signal may travel along a bone conduction pathway specific to the user. The receiver may receive the signal. As a bone conduction signals travels along a bone conduction signal pathway, the bone conduction signal may pick up or include noise (for example, from movement of the user and/or ambient sound occurring nearby or proximal the user). The receiver or other circuitry of the wearable device may remove or cancel such noise (for example, by removing frequencies outside of the frequency chosen by the transmitter). The receiver may then transmit the bone conduction signal to the computing device. In an embodiment, the receiver and/or the wearable device may, prior to transmission to the computing device, decrypt the bone conduction signal.

The computing device may further be configured to or include circuitry configured to decrypt the bone conduction signal. The computing device may process the bone conduction signal (for example, filtering, segmenting, and/or normalizing the bone conduction signal). The processed bone conduction signal may then be decrypted, if not already decrypted by the receiver or wearable device. The computing device may then analyze the bone conduction signal to generate or separate the pilot portion and token portion from the bone conduction signal. The token portion may be utilized to ensure that the message is authentic, while the pilot portion and/or the bone conduction signal itself may be utilized to determine that the user is authentic. Upon authentication of the bone conduction signal and the user, the computing device may transmit a signal to the wearable device indicating the authentication and, thus, allowing the user to utilize or to continue to utilize the wearable device.

In an embodiment, authentication may occur continuously, substantially continuously, and/or periodically (for example, a preselected period of time). The authentication may occur during use of the wearable device. Additionally, authentication may be prompted by the user and/or the wearable device, for example, when a user initially wears the wearable device. In another embodiment, a user, upon initializing a wearable device, may provide various bone conduction signal samples to produce a bone conduction signal signature. Such an initialization may occur automatically and/or without user intervention.

Accordingly, an embodiment of the disclosure is directed to a system for non-intrusive device authentication for a user. The system may include a waveform generator engine. The waveform engine generator may be configured to generate a message. The message may include or comprise a pilot portion and a token portion. The waveform generator may be configured to encrypt the message via a shared key to thereby generate an encrypted message. The waveform generator may be configured to transmit the encrypted message to a wearable device. The system may include the wearable device. The wearable device may include or comprise one or more transmitters. The one or more transmitters may be configured to emit the encrypted message as an inaudible message, an unnoticeable message, or a just noticeable message. The wearable device may further include or comprise one or more receivers. The one or more receivers may be configured to receive the inaudible message, the unnoticeable message, or the just noticeable message emitted from the one or more transmitters as a bone conduction signal. The one or more receivers or the wearable device may be configured to cancel noise in the bone conduction signal. The system may include a decryption engine. The decryption engine may be configured to process the bone conduction signal from the one or more receivers to thereby generate a processed bone conduction signal. The decryption engine may be configured to decrypt the processed bone conduction signal via the shared key to thereby generate a decrypted bone conduction signal. The decryption engine may be configured to separate a bone conduction token portion from the decrypted bone conduction signal. The system may include an authentication engine. The authentication engine may be configured to analyze the bone conduction signal. The authentication engine may be configured to, in response to a comparison of the analyzed bone conduction signal and the pilot portion of the message exceeding a preselected threshold, authenticate a user. The authentication engine may be configured to verify bone conduction signal authenticity via the bone conduction token portion and the token portion.

In an embodiment, the non-intrusive device authentication may occur iteratively. Each iteration of authentication may occur sequentially and/or substantially simultaneously. In an embodiment, the user and/or the wearable device may request non-intrusive device authentication at any time.

In an embodiment, the system may include or comprise a computing device. The computing device may include or comprise the waveform generator engine, the decryption engine, and/or authentication engine. The computing device may store the shared key. The shared key may be accessible, via internal signal communication, by the waveform generator engine, the decryption engine, and/or the authentication engine.

In an embodiment, the noise cancelled from the bone conduction signal may include human activity and other activity. Human activity may include speech, footsteps, respiration, or noise generated by dental articulation or other user movement. Other activity may include noise generated by music, speech from other sources, or background noise.

In an embodiment, the waveform generator engine and the decryption engine may utilize a Rivest-Shamir-Adleman (RSA) based algorithm to obtain the shared key for encryption and a private key for decryption.

In an embodiment, the pilot portion may comprise data corresponding to a user's initializing bone conduction signal. The initializing bone conduction signal may comprise one or more previously analyzed bone conduction signals from the user. The pilot portion may comprise a Zadoff-Chu sequence along one or more subcarriers of a carrier of the encrypted message. The pilot portion may fill the one or more subcarriers. The token portion may comprise one or more of a user identification, a device identification, a timestamp, or random bits.

In an embodiment, the waveform generator engine may further be configured to modulate the encrypted message prior to transmission. The waveform generator engine may modulate the encrypted signal using a differential phase shift keying (DPSK) algorithm. The waveform generator may further be configured to, after modulation of the encrypted message, convert the modulated encrypted message into a time domain waveform via an inverse Fourier transform (IFFT).

In an embodiment, the one or more transmitters may comprise bone conduction speakers. The one or more receivers may comprise in-ear microphones. The one or more transmitters may comprise a plurality of transmitters. The plurality of transmitters may be configured to transmit the encrypted message via one or more of alternating transmissions, random transmission, or simultaneous transmission. The one or more receivers may comprise at least two receivers. One receiver may be positioned in a contralateral ear canal and another receiver may be positioned in an ipsilateral ear canal. During transmission of the encrypted message, the one receiver and the another receiver may be configured to receive the encrypted message as the bone conduction signal, via a cross-talk pathway and/or via a direct pathway.

In an embodiment, the encrypted message may be transmitted as one or more of an ultra-high frequency or an ultra-low frequency. The ultra-high frequency may comprise a range of about 16 kHz to about 48 kHz. The ultra-high frequency comprises a signal at about 48 kHz. The ultra-high frequency may comprise an ultrasound signal. The ultra-low frequency may comprise a signal at about 20 Hz to about 200 Hz.

The decryption engine may process the bone conduction signal by one or more of filtering, denoising, segmenting, or normalizing the bone conduction signal. Authentication may further be based on a score exceeding a threshold. The authentication engine may be configured to generate the score by applying a classifier generated by a machine learning model to the bone conduction signal.

Another embodiment of the disclosure is directed to a system for non-intrusive device authentication. The system may include a waveform generator. The waveform generator may be configured to, in response to detection of operation of a user's device, generate a message. The message may comprise a pilot portion and a token portion. The waveform generator may be configured to encrypt the message via a shared key to thereby generate an encrypted message. The waveform generator may be configured to transmit the encrypted message to one or more transmitters corresponding to a user's device. The system may include a decryption engine. The decryption engine may be configured to receive a bone conduction signal from one or more receivers. The one or more receivers may receive the encrypted message as the bone conduction signal from the one or more transmitters. The decryption engine may be configured to process the bone conduction signal to thereby generate a processed bone conduction signal. The decryption engine may be configured to decrypt the processed bone conduction signal via the shared key to thereby generate a decrypted bone conduction signal. The decryption engine may be configured to separate a bone conduction token portion from the decrypted bone conduction signal. The system may include an authentication engine. The authentication engine may be configured to analyze the bone conduction signal. The authentication engine may be configured to, in response to a comparison of the analyzed bone conduction signal and the pilot portion of the message exceeding a preselected threshold, authenticate a user for the operation detected. The authentication engine may be configured to verify bone conduction signal authenticity via the bone conduction token portion and the token portion.

In an embodiment, analysis of the bone conduction signal may include, via the authentication engine, extraction of features via a trained neural network or other machine learning model. The authentication engine may further be configured to add extracted features to a bone conduction embedding. The authentication engine may be configured to evaluate the bone conduction embedding to produce a score. The authentication engine may be configured to, in response to the score exceeding a preselected, authenticate user operation of the device.

Another embodiment of the disclosure is directed to a method for non-intrusive authentication of a user. The method may include generating a waveform. The waveform may include or comprise a pilot portion and a token portion. The method may include encrypting the waveform via a shared key to generate an encrypted waveform. The method may include modulating, via one or more preselected frequencies, the encrypted waveform to generate a modulated encrypted waveform. The method may include transmitting the modulated encrypted waveform to one or more transmitters associated with the user to be authenticated. The method may include transmitting the modulated encrypted waveform from the one or more transmitters as a bone conduction signal. The method may include receiving the bone conduction signal at one or more receivers. The method may include denoising the bone conduction signal. The method may include demodulating the bone conduction signal via the one or more preselected frequencies. The method may include decrypting the demodulated bone conduction signal via the shared key. The method may include verifying authenticity of the decrypted demodulated bone conduction signal based on the token portion. The method may include authenticating the user based on the pilot portion of the decrypted demodulated bone conduction signal.

A smart device may include or comprise the one or more transmitters and the one or more receivers. The method may further include, upon authentication of the user and verification of the bone conduction signal, allowing the user to one or more of (a) access or utilize the smart device, (b) access data on a smart device, or (c) continue to use the smart device. The method may include, upon authentication of the user and verification of the bone conduction signal, allowing the user to (a) access or utilize the smart device and (b) access data on the smart device associated with the user. The method may include, upon authentication of the user and verification of the bone conduction signal, allowing the user to (a) access or utilize the smart device and (b) access personal data on the smart device associated with the user.

Another embodiment of the disclosure is directed to a method for non-intrusive authentication of a user. The method may include, during operation of a smart device by the user substantially continuously and iteratively. The method may include generating a waveform. The waveform may comprise a pilot portion and a token portion. The method may include encrypting the waveform via a shared key to generate an encrypted waveform. The method may include modulating, via one or more preselected frequencies, the encrypted waveform to generate a modulated encrypted waveform. The method may include transmitting the modulated encrypted waveform to one or more transmitters associated with the user to be authenticated. The method may include receiving a bone conduction signal from one or more receivers associated with the user to be authenticated. The method may include removing interference from the bone conduction signal. The method may include demodulating the bone conduction signal via the one or more preselected frequencies. The method may include decrypting the demodulated bone conduction signal via the shared key. The method may include verifying authenticity of the decrypted demodulated bone conduction signal based on the token portion. The method may include analyzing the bone conduction signal. The method may include authenticating the user based on the pilot portion and the analyzed bone conduction signal.

Another embodiment of the disclosure is directed to a smart device for non-intrusive and active device authentication for a user. The smart device may include a communications interface configured to receive an encrypted message signal from a computing device during smart device operation. The smart device may include a bone conduction speaker. The bone conduction speaker may be configured to receive the encrypted message. The bone conduction speaker may be an active device or component. The bone conduction speaker may be configured to emit the encrypted message as a bone conduction signal, the bone conduction signal being emitted at a frequency inaudible and/or unnoticeable or just noticeable via human hearing. The smart device may include a bone conduction microphone. The bone conduction microphone may be an active device or component. The bone conduction microphone may be configured to receive the bone conduction signal at the frequency to thereby generate a received bone conduction signal. The bone conduction microphone may be configured to transmit the received bone conduction signal to the computing device. The smart device may include an authentication circuitry. The authentication circuitry may be configured to receive a signal from the computing device indicative of user authentication and bone conduction signal verification. The authentication circuitry may be configured to, in response to reception of user authentication and bone conduction signal verification, enable user operation of the smart device. The authentication circuitry may further be configured to, in response to reception of user authentication and bone conduction signal verification, enable a user to access one or more of corresponding user data or applications corresponding to one or more of a user's permissions or a user's purchased applications. The authentication circuitry may be configured to, prior to a first authentication and verification, prompt a user to submit an enrollment template or response. The enrollment template or response may include a plurality of bone conduction signals based on a plurality of phrases. The authentication circuitry may be configured to update the enrollment template or response based on one or more of time intervals or user physiology.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the scope of the disclosure.

DETAILED DESCRIPTION

Figure 1A:
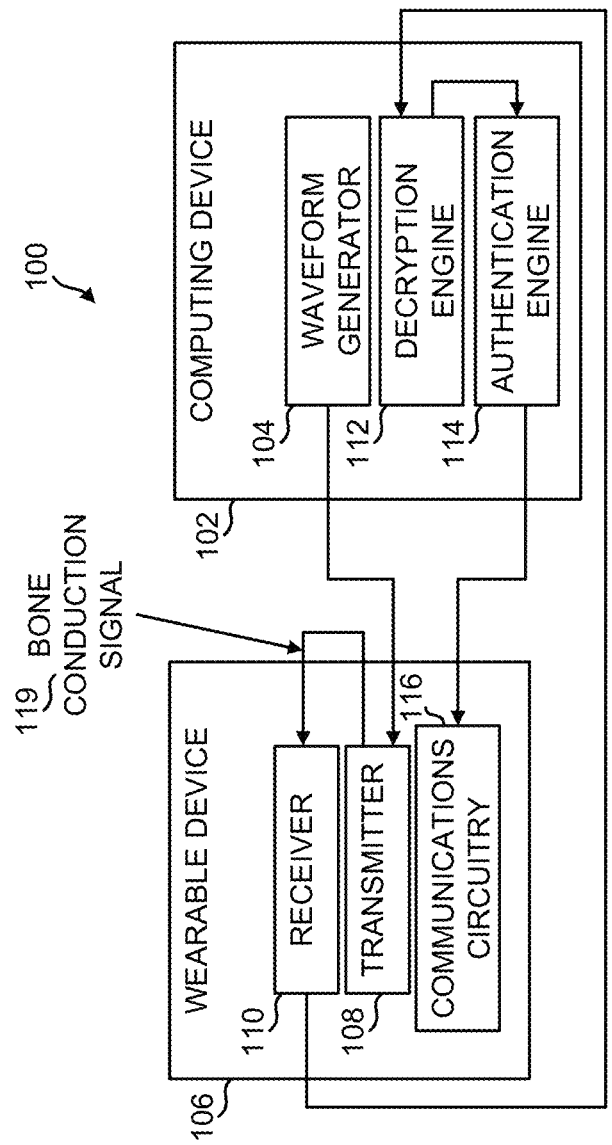
FIG. 1A, FIG. 1B, FIG. 1C, and FIG. 1D are block diagrams of systems to authenticate a user, according to an embodiment of the present disclosure.

So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

The present disclosure is generally directed to systems and methods for using or utilizing a bone conduction signal for continuous and/or active device authentication of a user non-intrusively. Such a system and method may include a computing device in signal communication with the wearable device. The computing device may include a waveform generator and/or instructions to generate a signal. The signal may include different messages or portions, such as a pilot portion, to indicate authenticity of a user (for example, based on a signature specific to a user's bone conduction pathway), and a token portion, to indicate authenticity of the signal (for example, to prevent authentication of tampered with or otherwise altered signals). The waveform generator and/or instructions may be configured to encrypt the message using one or more different encryption algorithms or instructions. For example, the computing device (such as, the waveform generator and/or instructions) may utilize a Rivest-Shamir-Adleman (RSA) algorithm to encrypt the signal. In other words, the computing device may encrypt the message using a public key and may decrypt a later received signal, as will be described below, using a privately shared key. In another embodiment, the wearable device may decrypt the message with the privately shared key. In yet another embodiment, other encryption algorithms or systems may be utilized, such as using a one-time key, a Diffie-Hellman key exchange, and/or other encryption algorithm or system as will be understood by one skilled in the art.

After the computing device encrypts the message, the message may be sent to the wearable device and/or a transmitter of the wearable device. The transmitter may include a speaker, bone conduction speaker, and/or other transmitter configured to transmit a signal as a bone conduction signal. The transmitter may be configured to transmit the encrypted signal as a bone conduction signal. The bone conduction signal may be transmitted as an inaudible message, an unnoticeable message, or a just noticeable message. For example, the bone conduction signal may be transmitted at a frequency inaudible to humans, such as ultra-low and/or ultra-high frequencies (such as, from about 16 kHz to about 48 kHz, from about 20 Hz to about 200 Hz, or at about ultrasound frequencies). In another embodiment, the bone conduction signal may be transmitted as a short-period acoustic signal patch to audible frequencies to achieve the non-intrusiveness. For example, time-frequency patterns with limited duration and bandwidth (such as, a short-duration-narrow-bandwidth time-frequency pattern), or smaller signals masked by a larger amplitude signal, even at audible frequencies (such as, via a psychoacoustic masking effect), may be utilized. Further, the transmitter may vary the frequency of the bone conduction signal each time an authentication request is received. In other words, each time the transmitter receives an encrypted signal, the transmitter may choose a different frequency from the last frequency used. Further still, the wearable device may include a plurality of transmitters. In such an embodiment, the each of the plurality of transmitters may choose different frequencies at which to transmit the bone conduction signal.

The wearable device may also include a receiver or a plurality of receivers. Each receiver may be located at an opposite end of a bone conduction pathway (for example, the receiver is positioned near a contralateral ear, while the transmitter is positioned near an ipsilateral ear) and/or proximal to the transmitter. Once the transmitter transmits the bone conduction signal, the bone conduction signal may travel along a bone conduction pathway specific to the user. The receiver may receive the signal. As a bone conduction signals travels along a bone conduction signal pathway, the bone conduction signal may pick up or include noise (for example, from movement of the user and/or ambient sound occurring nearby or proximal the user). The receiver or other circuitry of the wearable device may remove or cancel such noise (for example, by removing frequencies outside of the frequency chosen by the transmitter). The receiver may then transmit the bone conduction signal to the computing device. In an embodiment, the receiver and/or the wearable device may, prior to transmission to the computing device, decrypt the bone conduction signal.

The computing device may further be configured to or include circuitry configured to decrypt the bone conduction signal. The computing device may process the bone conduction signal (for example, filtering, segmenting, and/or normalizing the bone conduction signal). The processed bone conduction signal may then be decrypted, if not decrypted by the receiver or wearable device. The computing device may then analyze the bone conduction signal to generate or separate the pilot portion and token portion from the bone conduction signal. The token portion may be utilized to ensure that the message is authentic, while the pilot portion and/or the bone conduction signal itself may be utilized to determine that the user is authentic. Upon authentication of the bone conduction signal and the user, the computing device may transmit a signal to the wearable device indicating the authentication and, thus, allowing the user to utilize or to continue to utilize the wearable device.

In an embodiment, authentication may occur continuously, substantially continuously, and/or periodically (for example, after a preselected period of time). The authentication may occur during use of the wearable device. Additionally, authentication may be prompted by the user and/or the wearable device, for example, when a user initially wears the wearable device. In another embodiment, a user, upon initializing a wearable device, may provide various bone conduction signal samples to produce a bone conduction signal signature. Such an initialization may occur automatically and/or without user intervention, thus allowing a user to continue to use a wearable or mobile device without interruption or interference.

The wearable device, as described herein, may include earbuds, augmented reality (AR)/virtual reality (VR) devices, and/or other devices able to access a metaverse (for example, an immersive virtual reality platform). The systems and methods described herein may enable users to access specified user profiles, based on authentication. For example, two or more users sharing a wearable device may access corresponding personal settings upon wearing the wearable device (such as, based on the non-intrusive authentication). Thus, as different users wear the wearable device, the wearable device may display the wearer's personal settings and provide a seamless, personalized experience based on continuous and non-intrusive authentication. Further, if the wearable device is stolen or used by an unauthorized user, personal or private information may be protected, as the unauthorized user may not be able to access the personal settings of the other users.

Further, the authentication operation may tie or associate a user with a virtual character in the metaverse. Thus, a user may access their character from any wearable device. Additionally, even if a character is replicable, the user's identity is preserved for sensitive and personal application/data (for example, account information; and/or financial information, such as for online shopping/trading; among other sensitive and personal application/data, as will be understood by one skilled in the art). Further still, the systems and methods described herein may be utilized to continuously provide authentication for users in a classroom, teaching, and/or testing setting. Thus, each user's identity is authenticated continuously, without disrupting any of the users in such a setting, ensuring all participants are accounted.

As noted, authentication may occur continuously and/or actively. The computing device and/or the wearable device may prompt authentication of the user without any user interaction and/or intrusion at various intervals or periods or substantially continuously. The computing device may further use the continuous authentication operations to update a user's bone conduction signal signature.

FIG. 1A, FIG. 1B, FIG. 1C, and FIG. 1D are block diagrams of systems to authenticate a user, according to an embodiment of the present disclosure. The system 100 of FIG. 1A may illustrate, at a high level, the interaction between the wearable device 106 and a computing device 102 to automatically and/or substantially continuously authenticate a user to utilize the wearable device 106 without user interaction and/or intrusion (for example, to authenticate a user to enable the user to perform one or more functions, including, but not limited to, operating a drone, playing music or videos, accessing user data or information, and/or performing smart home functions, among other operations or functions). The system 100 may include a wearable device 106 and a computing device 102. The term "computing device" is used herein to refer to any one or all of servers, virtual computing device or environment, desktop computers, personal data assistants (PDAs), laptop computers, tablet computers, smart books, palm-top computers, personal computers, smartphones, wearable devices (such as headsets, earbuds, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices. In an embodiment, rather than a wearable device 106, the computing device 102 may connect to a mobile device for authentication purposes.

The term "server" or "server device" is used to refer to any computing device capable of functioning as a server, such as a master exchange server, web server, mail server, document server, or any other type of server. A server may be a dedicated computing device or a server module (for example, an application) hosted by a computing device that causes the computing device to operate as a server. A server module (for example, a server application) may be a full function server module, or a light or secondary server module (for example, light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (for example, an enterprise e-mail server) only to the extent necessary to provide the functionality described herein.

As used herein, a "non-transitory machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (such as, hard drive), a solid state drive, any type of storage disc, and the like, or a combination thereof. The memory may store or include instructions executable by the processor.

As used herein, a "processor" or "processing circuitry" may include, for example one processor or multiple processors included in a single device or distributed across multiple computing devices. The processor (such as, processor circuitry 124 shown in FIG. 1D) may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

The computing device 102 may include a processor and memory. The computing device 102 may further include instructions (for example, instructions stored in memory and executable by the processor), circuitry, and/or engines. In an embodiment, the computing device 102 may include a waveform generator 104, a decryption engine 112, and an authentication engine 114. Further, the computing device may be in signal communication with the wearable device 106 or another computing device and/or mobile device. The wearable device 106 (or other computing device and/or mobile device) may include one or more transmitters 108 and one or more receiver 110. Further, the wearable device 106 (or other computing device and/or mobile device) may include communications circuitry 116.

In an embodiment, the waveform generator 104 of the computing device 102 may be configured to generate a message. The message may comprise a pilot portion and a token portion. The pilot portion may comprise symbols. The pilot portion may include known sequences used to measure the bone conduction signal and/or a sequence submitted by a user during an initiation. Further, the pilot portion may be randomly chosen from a given set (for example, the set comprising data and/or symbols corresponding to an initial input, initialization, and/or additional inputs verified and/or confirmed as being from a corresponding user). The token portion may include data corresponding to one or more of a user ID, a time stamp, or a random selection of bits.

The waveform generator 104 may further be configured to encrypt the message. In an embodiment, the waveform generator 104 may encrypt the token portion or the pilot portion, rather the entire message (for example, the pilot portion and the token portion). The waveform generator 104 may use a number of different encryption algorithms, for example a RSA algorithm, Diffie-Helman algorithm, or other encryption algorithms, as will be understood by one skilled in the art. Since the computing device may encrypt and then decrypt the message (such as, after the message is received back from the wearable device), a single key may be used. However, as noted, other algorithms may be utilized such as RSA (for example, the computing device 102 may access a public key for encryption and include or store a private key to decrypt the message or portion of the message). Once the message or portion of the message is encrypted, the waveform generator 104 may be configured to transmit the encrypted message to the wearable device 106.

The wearable device 106 may be configured to receive the encrypted message at the transmitter 108 and/or the communications circuitry 116 of the wearable device 106. The wearable device 106 may include, as noted, one or more transmitters. The transmitter 108 may transmit the encrypted message as an inaudible, substantially inaudible, unnoticeable, or just noticeable (or some combination thereof) bone conduction signal. In other words, the encrypted message may be transmitted via the transmitter 108 without interaction from the user and/or interruption of use of the wearable device 106. The bone conduction message may be transmitted at a low frequency and/or a high frequency. The frequency of the transmitted message may vary each time an operation is undertaken. The frequency may be at about 16 kHz to about 48 kHz, about 48 kHz, about 20 Hz to about 200 Hz, and/or at an ultrasound frequency. The frequency of transmission may be determined based on user comfort and experience (for example, limited, minute, and/or no use interruption). As noted, the bone conduction signal may be transmitted as a short-period acoustic signal patch to audible frequencies to achieve the non-intrusiveness. For example, time-frequency patterns with limited duration and bandwidth (such as, a short-duration-narrow-bandwidth time-frequency pattern), or smaller signals masked by a larger amplitude signal, even at audible frequencies (such as, via a psychoacoustic masking effect), may be utilized. In an embodiment, the transmitter 108 may include speakers, in-ear speakers, bone conduction speakers, and/or a speaker capable of fitting within a user's ear or ear canal and configured to transmit the bone conduction signal. In another embodiment, if the wearable device includes at least two transmitters, then each transmitter may transmit the bone conduction signal at different or the same frequencies. Further, for subsequent authentication processes, each transmitter may be configured to transmit the bone conduction signal at a frequency different from the previously utilized frequency.

The wearable device 106 may include one or more receivers (for example, receiver 110). The receiver 110 may be configured to receive an inaudible, substantially inaudible, unnoticeable, or just noticeable (or some combination thereof) bone conduction signal 119. The bone conduction signal 119 may be received via direct and/or crosstalk bone conduction channels (for example, within a user's ear canal and/or through a user's bone conduction pathway). The receiver 110 may be configured to remove noise (for example, noise based on user movement, such as footsteps, arm movement, jaw movement, neck movement, dental articulation, and/or any other movement by the user; noise based on user communication, speech, and/or respiration; and/or noise based on ambient sound of a user's environment such as speech by others, music, and/or background noise; among other noise, as will be understood by one skilled in the art) from a received bone conduction signal 119. The noise may be reduced, canceled, or removed based on different frequencies outside of the expected or actual frequency the bone conduction signal 119 is transmitted at. The bone conduction signal 119 may then be transmitted (for example, via the receiver 110, via the transmitter 108, and/or other communications circuitry) to the computing device 102. The computing device 102 may be configured to receive the bone conduction signal from the receiver 110. In an embodiment, the receiver 110 may be an in-ear microphone or in-ear bone conduction microphone.

In an embodiment, prior to transmitting the bone conduction signal 119 via the transmitter 108 to the receiver 110, the wearable device 106 may ensure or check that the wearable device 105 is properly worn by a user. In another embodiment, the wearable device 106 may determine whether the receiver 110 and the transmitter 108 are properly worn prior to transmission of the bone conduction signal 119. In an embodiment, the transmitter 108 and/or the receiver 110 may be active components. In other words, the transmitter 108 may actively search and/or scan for new bone conduction signals to transmit. Further, the receiver 110 may actively listen and/or scan for the transmitted bone conduction signal from the transmitter 108.

As noted, the computing device 102 may include a decryption engine 112. The decryption engine 112 may receive the bone conduction signal. In an embodiment, the wearable device 106 may include encryption/decryption circuitry. In such examples, the wearable device 106 may decrypt (for example, using a private key known by the computing device 102 and the wearable device 106) the receive bone conduction signal prior to transmission via the transmitter 108 to the receiver 110. The wearable device 106 may then encrypt (for example, via a public key accessible by the wearable device 106) the denoised bone conduction signal from the receiver 110 prior to transmission to the computing device 102.

Upon reception of the bone conduction signal by the computing device 102, the decryption engine 112 may be configured to process the bone conduction signal. Processing the bone conduction signal may include filtering the bone conduction signal (for example, passing the bone conduction signal through a low-pass filter to remove noise generated by human motion and/or a Wiener filter to remove noise), segmenting the bone conduction signal (for example, removing non-relevant portions of the received bone conduction signal, and/or normalizing or synchronizing the bone conduction signal. Normalizing or synchronizing may include adjusting the signal based on a time delay between the received bone conduction signal and the transmitted bone conduction signal. The decryption engine 112 may, after processing the bone conduction signal, decrypt the bone conduction signal. Decryption may include, as noted, a RSA algorithm or other encryption/decryption algorithm or instructions. For example, the decryption engine 112 may obtain from memory of the computing device 102 or may include a private key. The private key may be shared between the wearable device 106 and the computing device 102 upon initialization. Further, each other wearable device may share a different private key with the computing device 102. The decryption engine 112 may use the private key to decrypt the encrypted bone conduction signal.

The computing device 102 may include an authentication engine 114. The authentication engine 114 may be configured to analyze the decrypted bone conduction signal. Such analysis may include extracting features from the bone conduction signal (for example, via neural network or other trained machine learning model), embedding the extracting features in a vector or bone conduction signal vector, generating a score by applying the vector to a classifier or other machine learning module, and comparing the score to a threshold score to indicate whether the user is authentic or not. In other words, the score may indicate whether the bone conduction signal is from a known user, an initialized user, or the user associated with the bone conduction signal. The authentication engine 114, in another embodiment, may compare the bone conduction signal and/or the pilot portion of the bone conduction signal to known values (for example, one or more known initialization values from a user) to determine whether the user is authentic or is verified. The authentication engine 114 may further verify the bone conduction signal authenticity (for example, not a fake or spoofed bone conduction signal) using the token portion included in the bone conductions signal, for example, by comparing the token portion to a user identification (ID), a device ID, a timestamp, or random bits originally generated by the computing device 102 and/or waveform generator 104.

Figure 1B:
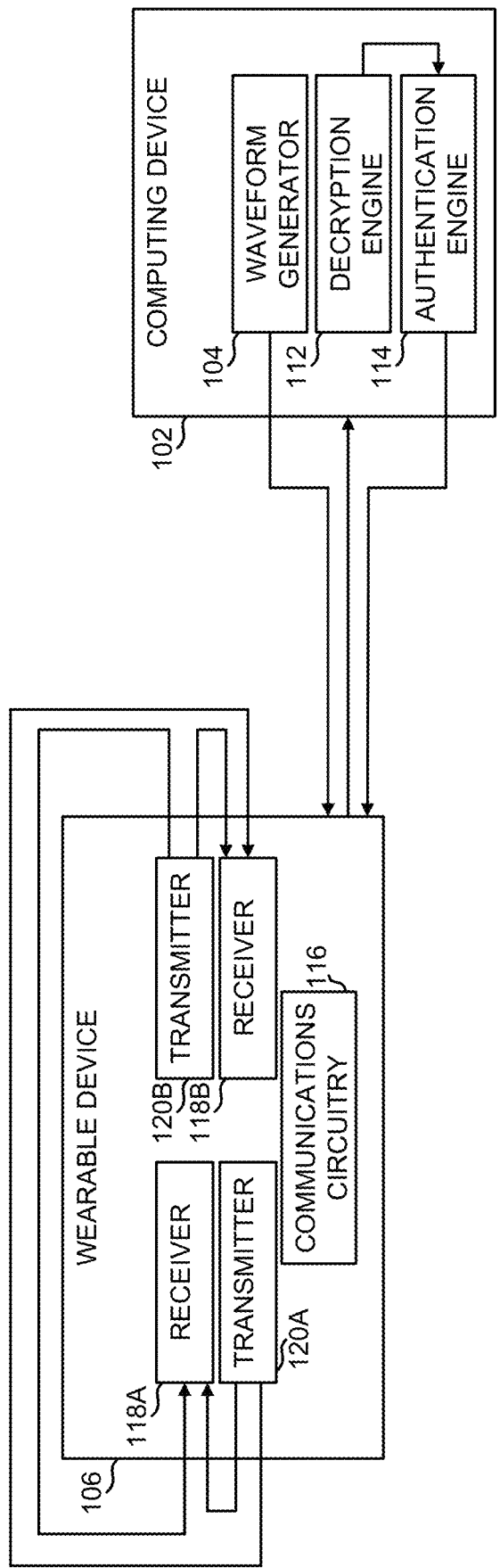

Turning to FIG. 1B, the wearable device 106 may include at least two transmitters 120A, 120B and at least two receivers 118A, 118B. The bone conduction signal may be transmitted by one or more of the two transmitters 120A, 120B. Further, each of the two transmitters 120A, 120B, may utilize different frequencies to transmit the bone conduction signals. The two receivers 118A, 118B may receive the bone conduction signal from one or more of the two transmitters 120A, 120B (for example, directly or via a cross-talk pathway). In such examples, the computing device 102 may indicate, via a signal included with the encrypted message, which of the at least two transmitters 120A, 120B to transmit from and which of the at least two receivers 118A, 118B to receive the corresponding bone conduction signals. Further, the computing device 102 may indicate or specify that the two receivers 118A, 118B may receive the bone conduction signal via direct or crosstalk bone conduction signals or, in other words, which of the two transmitters 120A, 120B to receive the bone conduction signal from. The two receivers 118A, 118B may determine which bone conduction signal is from which of the two transmitters 120A, 120B based on one or more of time received or an indicator included in the bone conduction signal. Further, the two transmitters 120A, 120B chosen and the two receivers 118A, 118B chosen may be different for each subsequent authentication process. As authentication may occur continuously or substantially continuously, various different and random combinations may be utilized to further enhance security and prevent fake users and/or spoofing.

Figure 1C:
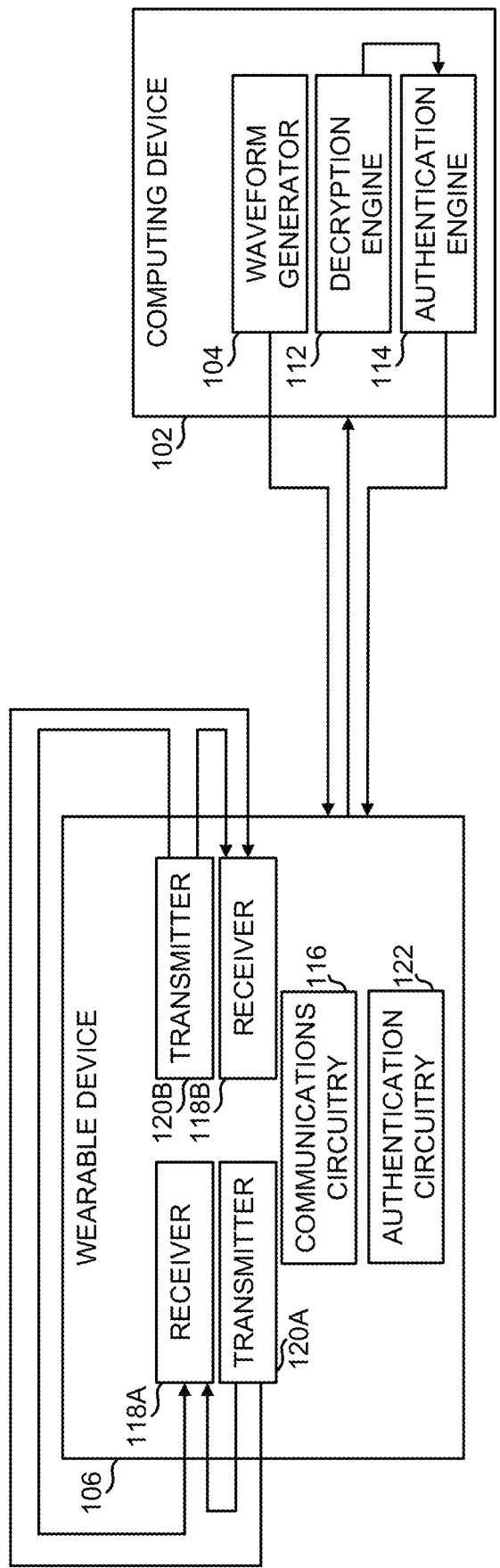

Turning to FIG. 1C, the wearable device 106 may include an authentication circuitry 122. The authentication circuitry 122 may be configured to receive user authentication from the computing device 102. In another embodiment, the authentication circuitry 122 may be configured to receive a request for authentication from the user (for example, via a physical, textual, or verbal response). In another embodiment, the authentication circuitry 122 may include a key. The key (for example, a private key) may be used to decrypt the bone conduction message. In another embodiment, the authentication circuitry 122 may be configured to encrypt the bone conduction signal. In another example, the key may be securely exchanged with the computing device 102 (for example, via a Diffie-Hellman exchange).

After authentication of a user, the user may be able to utilize the wearable device 106, access a specified set of data, and/or utilize a corresponding or associate mobile device (for example, the mobile device including or in communication with the wearable device 106). Such operations described above may be performed on a continuous basis, a substantially continuous basis, and/or after a specified or preselected time period has lapsed. Such a basis (for example, continuous or periodic) may be based on or defined by use of the wearable device 106 by the user. In other words, authentication operations may continue while the wearable device 106 is in use.

In another embodiment, the score generated that indicates user authenticity may further indicate partial authentication. In such an embodiment, partial authentication may be defined by a score in a specified range. The user may be able to utilize basic functionality of the wearable device 106 until the user is authenticated or indicates authenticity in another way (for example, via two-factor authentication via another form of communication).

In another embodiment, the computing device 106 may utilize characteristic of a received bone conduction signal from the wearable device to determine user authenticity. For example, the computing device 106 may extract features (such as, via a neural network or other machine learning model) from the bone conduction signal itself. The computing device 106 may then add the extracted features to an embeddings or vector. The computing device 106 may compare or generate a score for the embeddings or vectors using a known bone conduction signal from the user, which may be indicated by the pilot portion of the message. As noted herein, if the score exceeds a threshold, then the computing device 106 may authenticate the user.

Figure 1D:
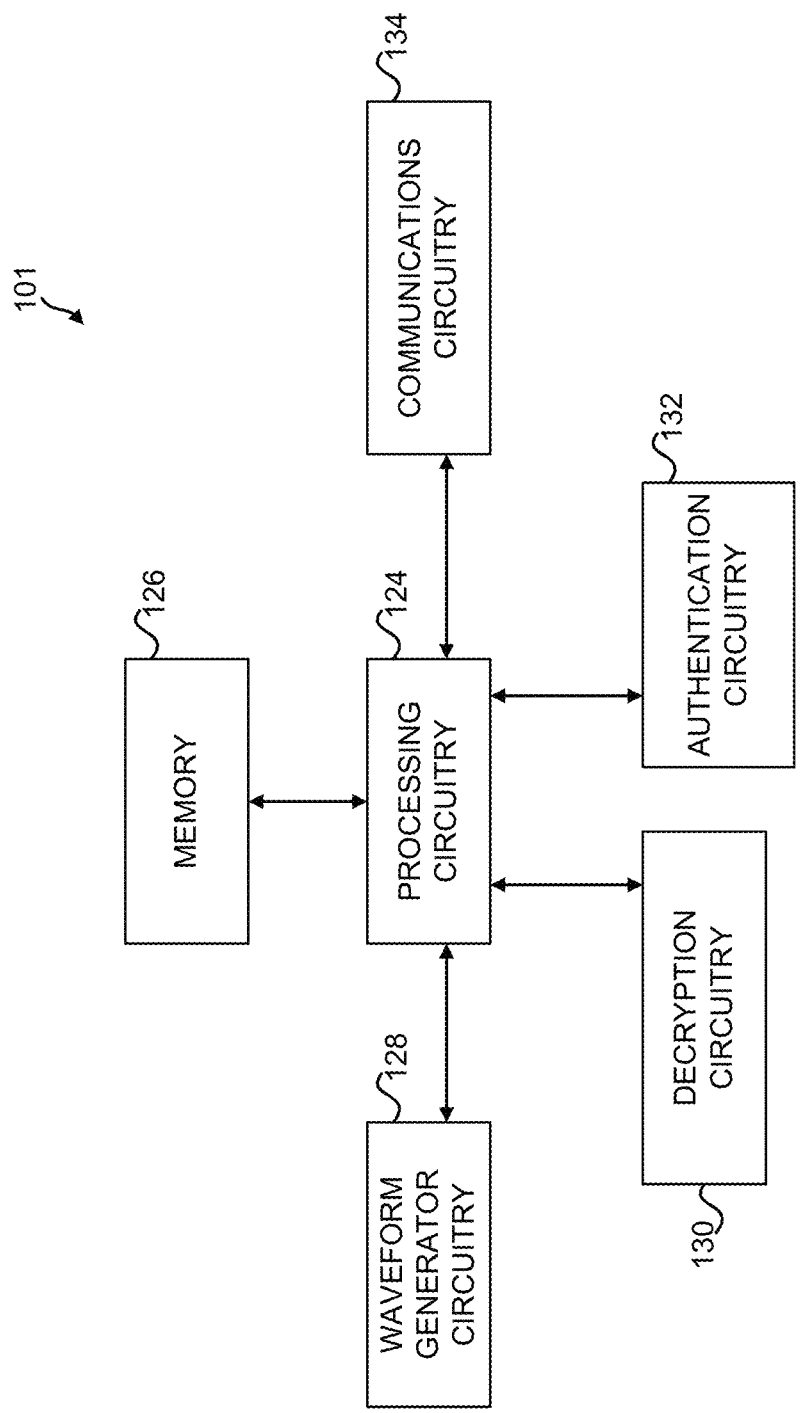

Turning to FIG. 1D, the system 101 or apparatus may include processing circuitry 124, memory 126, communications circuitry 134, waveform generator circuitry 128, decryption circuitry 136, and authentication circuitry 132, each of which will be described in greater detail below. While the various components are illustrated in FIG. 1D as being connected with processing circuitry 124, it will be understood that the system 101 or apparatus may further comprise a bus (not expressly shown in FIG. 1D) for passing information amongst any combination of the various components of the system 101 or apparatus. The system 101 or apparatus further may include programming or instructions configured to execute various operations described herein, such as those described above in connection with FIGS. 1A through 1B and below in connection with FIGS. 2 through 6B.

The processing circuitry 124 (and/or co-processor or any other processor assisting or otherwise associated therewith) may be in communication with the memory 126 via a bus for passing information amongst components of the system 101 or apparatus. The processing circuitry 124 may be embodied in a number of different ways and may, for example, include one or more processing devices configured to perform independently. Furthermore, the processing circuitry 124 may include one or more processors configured in tandem via a bus to enable independent execution of software instructions, pipelining, and/or multithreading. The use of the term "processor" may be understood to include a single core processor, a multi-core processor, multiple processors of the system 101 or apparatus, remote or "cloud" processors, or any combination thereof.

The processing circuitry 124 may be configured to execute software instructions stored in the memory 126 or otherwise accessible to the processing circuitry 124. In some cases, the processing circuitry 124 may be configured to execute hard-coded functionality. As such, whether configured by hardware or software methods, or by a combination of hardware with software, the processing circuitry 124 represents an entity or device (for example, an element that can be physically embodied in circuitry) capable of performing operations according to various embodiments of the present disclosure while configured accordingly. Alternatively, as another example, when the processing circuitry 124 is embodied as an executor of software instructions, the software instructions may specifically configure the processing circuitry 124 to perform the algorithms and/or operations described herein when the software instructions are executed.

The memory 126 may be a non-transitory machine readable storage medium and may include, for example, one or more volatile and/or non-volatile memories. In other words, for example, the memory 126 may be an electronic storage device (for example, a computer readable storage medium). The memory 126 may be configured to store information, data, content, applications, software instructions, or the like, for enabling the apparatus to carry out various functions in accordance with example embodiments contemplated herein.

The communications circuitry 134 or communications interface may include at least one device or circuitry embodied in either hardware or a combination of hardware and software that is configured to receive and/or transmit data from/to a network and/or any other device, wearable device, mobile device, circuitry, or module in communication with the system 101 or apparatus. In this regard, the communications circuitry 134 may include, for example, a network interface for enabling communications with a wired or wireless communication network. For example, the communications circuitry 134 may include one or more network interface cards, antennas, buses, switches, routers, modems, and supporting hardware and/or software, or any other device suitable for enabling communications via a network. Furthermore, the communications circuitry 134 may include the processing circuitry 124 for causing transmission of such signals to a network or for handling receipt of signals received from a network.

The system 101 or apparatus generally will include a waveform generator circuitry 128, configured to generate a message, encrypt the message, and transmit the message to a wearable device. The waveform generator circuitry 128 may generate a message based on data corresponding to a user to be authenticated. The data may include previously stored data relating to initiation of the wearable device by the user. The data may also include a user ID, a device ID, a timestamp, and/or a random number of bits. The waveform generator circuitry 128 may be configured to encrypt the message. Such an encryption may be performed by encryption/decryption instructions or algorithms in the waveform generator circuitry 128 and/or stored in memory 126. The waveform generator circuitry 128 may utilize a public key or a one-time key to encrypt the message. The waveform generator circuitry 128 may also transmit the encrypted message to the wearable device (for example, via the communications circuitry 134).

The system 101 or apparatus may include a decryption circuitry 130 configured to decrypt a received bone conduction signal (for example, received from a wearable device) and/or process the received bone conduction signal. The decryption circuitry 130 may include or may access in memory 126 a private key or the one-time generated key to decrypt the encrypted bone conduction signal. Further, the decryption circuitry 130 may process the decrypted bone conduction signal. The processing may include filtering the bone conduction signal (for example, passing the bone conduction signal through a low-pass filter to remove noise generated by human motion and/or a Wiener filter to remove noise), segmenting the bone conduction signal (for example, removing non-relevant portions of the received bone conduction signal, and/or normalizing the bone conduction signal. Normalization may include adjusting the decrypted bone conduction signal based on a timestamp included in the bone conduction signal. The bone conduction signal may be processed further using various other techniques as will be understood by one skilled in the art.

The system 101 or apparatus may include a authentication circuitry 132 configured to authenticate and verify the bone conduction signal and send the authentication to a wearable device. The authentication circuitry 132 may, to begin authentication and verification, analyze the bone conduction signal. Such analysis may include extracting features from the bone conduction signal or a portion of the bone conduction signal via a model or classifier (for example, such as a trained neural network). The extracted features may then be embedded in a vector and the vector may be applied to another model or classifier to generate a score. The score may indicate user authenticity. Further, the score may indicate some level of authenticity below full authentication (for example, based on selected score range). Finally, after decryption, the authentication circuitry 132 may verify portions of the bone conduction signal based on user and/or device data. The authentication circuitry 132 may further be configured to transmit a user authentication signal to a wearable device.

Figure 2:
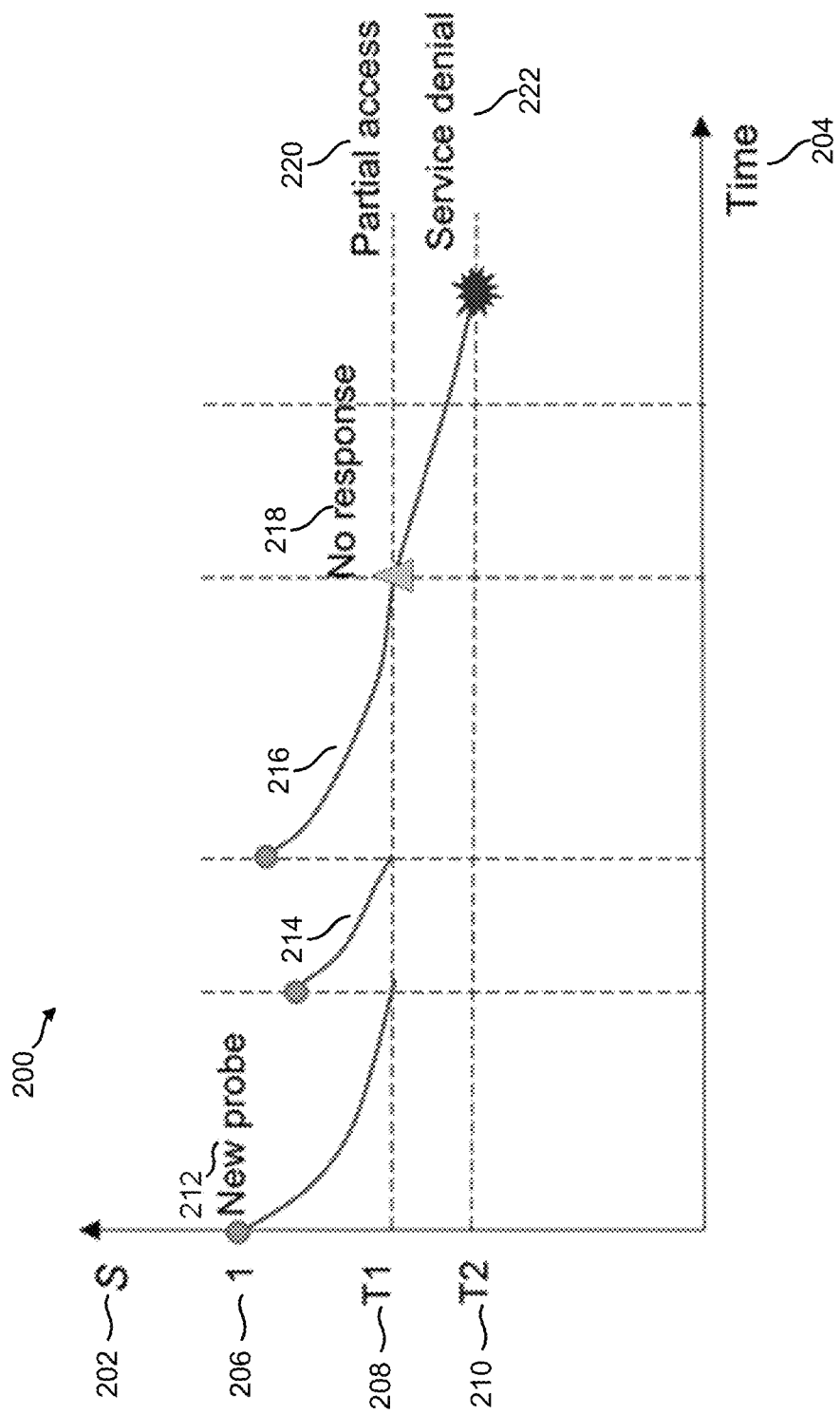
FIG. 2 is a graphical representation of user authentication over time, according to an embodiment of the present disclosure.

FIG. 2 is a graphical representation 200 of user authentication over time 204, according to an embodiment of the present disclosure. The graph may include a S axis 202 representing a time when various signals are received. For example, at "1" 206, a new probe or bone conduction signal (for example, new probe 212, 214, and 216) may be received at a wearable device. A computing device may perform authentication and send the results to the wearable device by time "T1" 208. If authentication is received, then the user may continue to use the wearable device. However, if no response or authentication is received (for example, see no response 218) at time "T2", then the wearable device may provide partial access 220 to the wearable device (for example, use or access of limited data, and/or use of standard applications, among other limited uses and/or access). If no response is received at "T2", the wearable device may prevent user access or use. As indicated in the graphical representation 200, the authentication operation may be continuous or substantially continuous.

Figure 3:
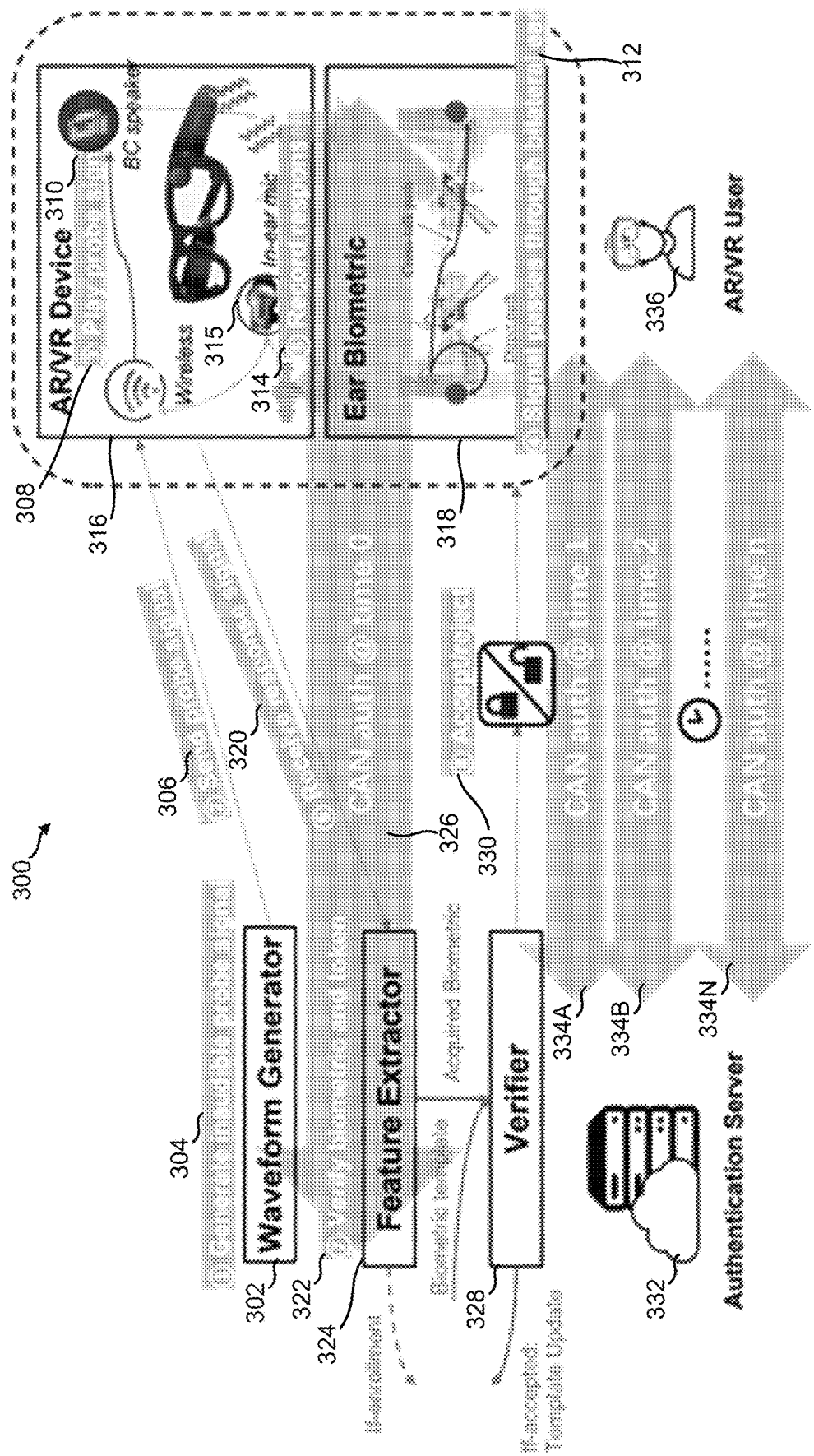
FIG. 3 is a block diagram of a system to authenticate a user, according to an embodiment of the present disclosure.

FIG. 3 is a block diagram of a system to authenticate a user 336, according to an embodiment of the present disclosure. As an authentication process begins, s waveform generator 302 of an authentication server 332 may generate an inaudible or unnoticeable (or substantially inaudible or unnoticeable) probe signal at 304. The waveform generator 302 may send the probe signal at 306 to an augmented reality (AR) or virtual reality (VR) device 316 or other computing device. A bone conduction speaker 310 of the AR/VR device 316 may play the probe signal at 308. The probe signal may pass through an bone conduction pathway to pick up an ear biometric 318 at 312 and received and recorded at 314 by an in-ear mic 315. The recorded response signal may be transmitted to the authentication server 332 at 320. The authentication server 332 may then verify the bear biometric 318 and a token at 322. Such verification may begin with feature extraction. Extracted features may then be compared to ear biometric templates at a verifier 328 (for example, the acquired ear biometric 318 may be compared to initial ear biometrics from a user 336). If no ear biometric templates are stored, the authentication server 332 may enter an initialization phase and record the acquired biometric. Further, the authentication server 332 may request additional ear biometrics. If the ear biometric is updated and is different than the ear biometric template (for example, different, but not different enough to cause rejection of authentication), the authentication server 332 may save the ear biometric as a new template. In an example, as a user 336 changes over time (for example, gains or loses weight and/or changes physically in some other way), that user's 336 ear biometric may change.

If the ear biometric 318 is accepted, then the authentication server 332 may send an acceptance (or in some embodiments, a rejection) to the user 336 of the AR/VR device 316. The authentication operation may occur at various times, such as time 334A, 334B, and up to 334N. For each operation, the user's 336 ear biometric may be update or saved. In another embodiment, the authentication operation may be prompted by the user 336. In an embodiment, the user 336 and/or the authentication server 332 may set the frequency of each authentication operation. Further, the authentication operation may be non-intrusive and active. The authentication server 332 may actively read a user's bilateral ear channel (for example, by transmitting, via a user device, a bone conduction signal to a receiver of the user device and receiving, from the receiver, the bone conduction signal at the authentication server 332 without user interaction and/or initiation). Further, the authentication server 332 may continuously request authentication and, based on any incremental changes to a bone conduction signal transmitted through the user's bilateral ear channel, may update the user's bone conduction signal signature (for example, a signature specific to a user's bone conduction pathway and/or various bone conduction signal samples utilized to produce a bone conduction signal signature).

During such operations the user 336 may not know or be aware that such an operation is occurring. In such embodiments, the probe signal may be played by the bone conduction speaker 310 as an inaudible signal (for example, at a frequency inaudible to humans), substantially inaudible signal, unnoticeable signal, or just unnoticeable signal (or some combination thereof). In another embodiment, the user 336 may disable authentication operations (for example, authentication no longer occurs unless prompted by the user 336). In yet another embodiment, operation of the AR/VR device 316 may be automatically cause an authentication operation to occur (for example, authentication operations occur while the AR/VR device 316 is in use).

Figure 4:
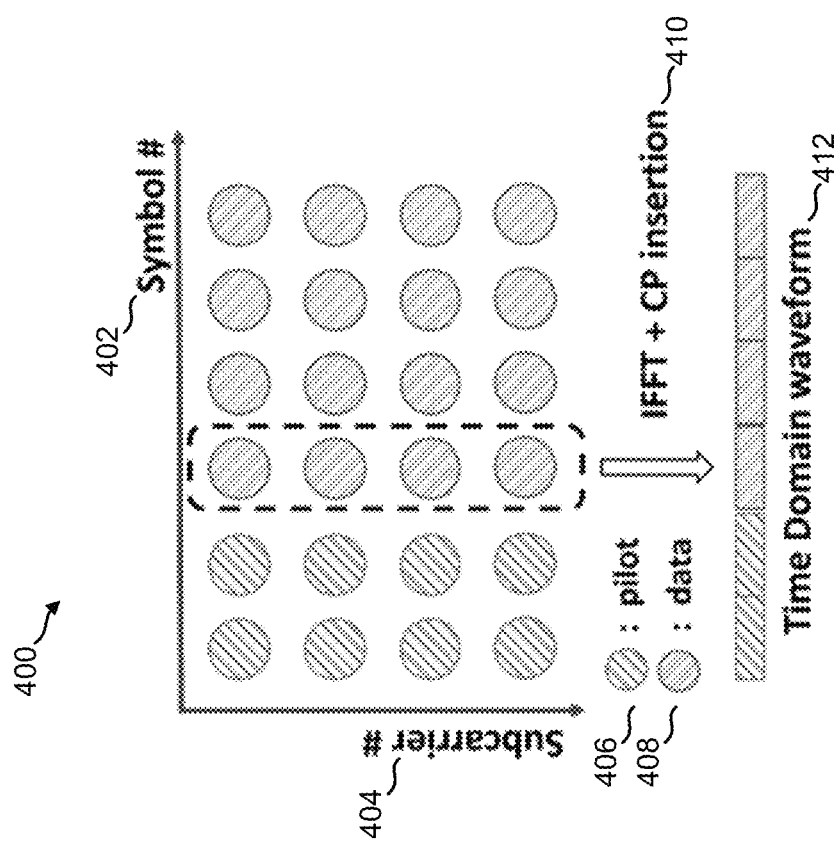
FIG. 4 is a graphical representation of data insertion in subcarriers, according to an embodiment of the present disclosure.

FIG. 4 is a graphical representation 400 of data insertion in subcarriers, according to an embodiment of the present disclosure. In an embodiment, pilot data 404 may be generated (for example, as symbols 402) at a fixed length for each authentication operation. The pilot data 404 may be loaded along the direction of the growing subcarrier index. The pilot data 404 may fill an entire subcarrier index or bandwidth. Further, other data bits 408 may be modulated onto the remaining subcarrier indices. Modulation may include differential phase key shifting. The symbols may then be converted by inverse Fourier Transform (IFFT) 410 into the time domain waveform 412. Thus, a message generated by a waveform generator may be processed such that the message may be sent or transmitted as a bone conduction signal.

Figure 5:
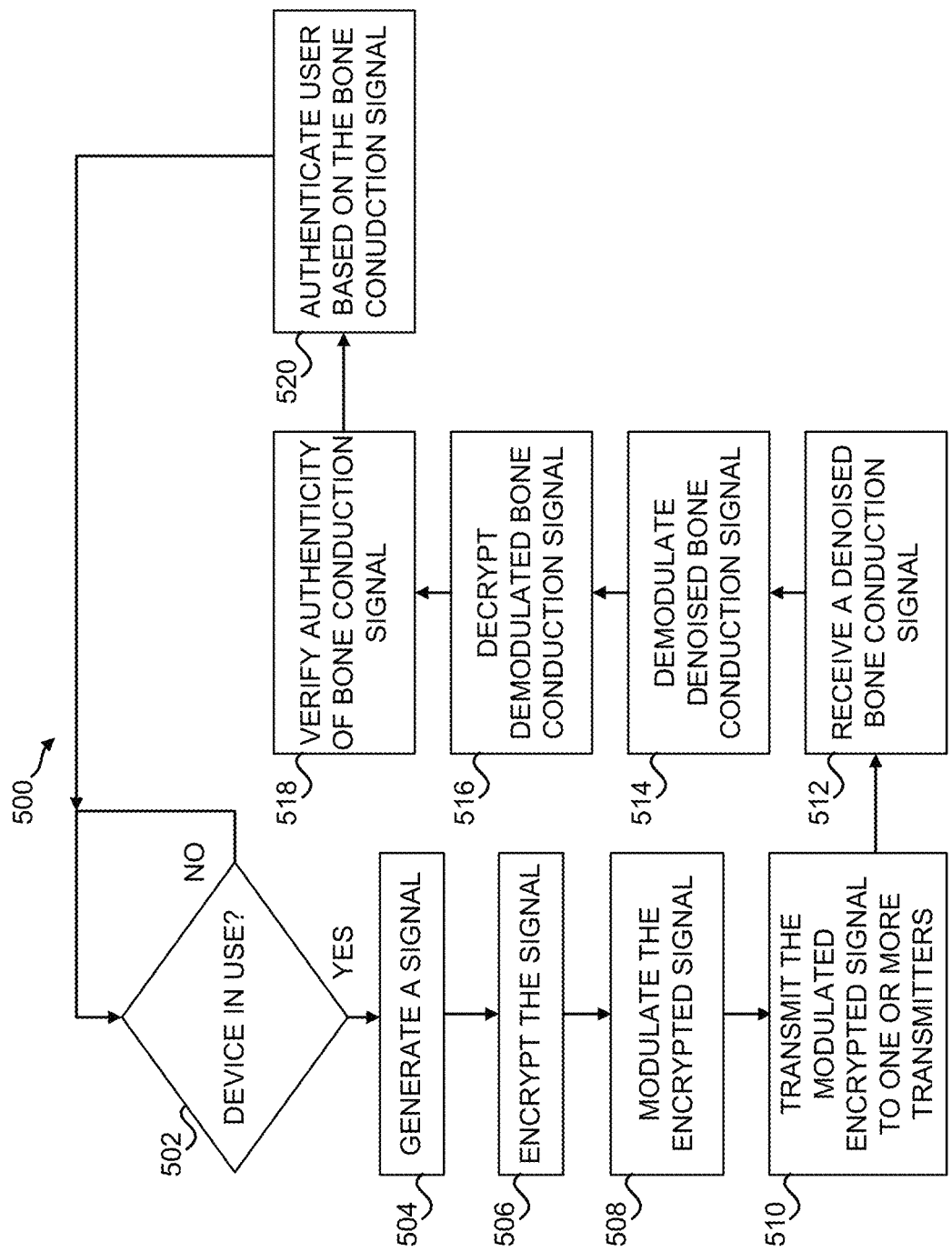
FIG. 5 is a flow diagram of continuous, active, and/or non-intrusive user authentication, according to an embodiment of the present disclosure.

FIG. 5 is a flow diagram of continuous, active, and/or non-intrusive user authentication, according to an embodiment of the present disclosure. It also will be understood that any of the FIGS. described herein may implement the method 500, in particular FIGS. 1A-1D and 3. The method 500 may be included in one or more programs, protocols, or instructions loaded into memory of a computing device. The order in which the operations are described is not intended to be construed as a limitation, and any number of the described blocks may be combined in any order and/or in parallel to implement the disclosed methods At block 502, a system may determine whether a wearable or mobile device is in use. The system may determine that the wearable or mobile device is in use via reception of a signal indicating use of the wearable or mobile device. Further, a user may indicate that the wearable or mobile device is in use. In yet another embodiment, while the wearable or mobile device is in use, the operations described in relation to method 500 may be continuously, substantially continuously, or periodically performed.

If the wearable or mobile device is in use, at block 504, the system may generate a signal. The system may include a waveform generator. The waveform generator may choose pilot data from a set of previously stored data relating or corresponding to the user. The waveform generator may add the pilot data to a subcarrier index. The waveform generator may also choose token data. The token data may include a user ID, a device ID, a timestamp, or randomly generated bits. The token data may also be added to a subcarrier index.

After the signal is generated, at block 506, the signal may be encrypted. The system may utilize one or more different encryption algorithms to encrypt the signal. For example, the system may retrieve a public key and encrypt the signal using the public key. The system may further generate a key and utilize the generated key to encrypt the signal. At block 508, the encrypted signal may be modulated as communication symbols (for example, the random bits may be converted or modulated to communication symbols transferable as a bone conduction or audio signal).

At block 510, the modulated encrypted signal may be sent or transmitted to one or more transmitters of the wearable or mobile device. The one or more transmitters may include bone conduction speakers configured to transmit the modulated encrypted signal as an inaudible signal, substantially inaudible signal, unnoticeable signal, or just unnoticeable signal (or some combination thereof). The one or more transmitters may be active components. The one or more transmitters may actively search and/or scan for the modulated encrypted signal and, upon reception of the modulated encrypted signal, automatically transmit the modulated encrypted. The one or more transmitters may be positioned within a user's ear canal. The one or more transmitters may transmit the bone conduction signal along a user's bone conduction pathway (for example, directly or via a cross-talk pathway) to one or more receivers. The one or more receivers may actively search, listen, and/or scan for the bone conduction signal and, upon reception of the bone conduction signal, automatically process the bone conduction signal and then send the processed bone conduction signal to the system. The one or more receivers may then transmit the bone conduction signal back to the system. Prior to such a transmission, the one or more receivers may denoise the bone conduction signal (for example, remove noise associated with user movement and/or ambient noise) and/or remove interference in the bone conduction signal. Thus, at block 512, the system may receive a denoised bone conduction signal from the one or more receivers.

At block 514, the system may demodulate the denoised bone conduction signal. The system may then, at block 516, decrypt the demodulated bone conduction signal. The type of decryption utilized may be based on the type of encryption utilized. For example, if a public key was used to encrypt the signal, a private key may be utilized to decrypt the bone conduction signal. In another example, if a one-time key is utilized, then the one-time key may be used for decryption.

At block 518, the system may verify the authenticity of a bone conduction signal based on the token portion of the bone conduction signal. If the token portion of the bone conduction matches the token portion of the original signal, then the system may verify that the bone conduction signal is authentic. At block 520, if the system determines that the bone conduction signal is authentic, then the system may authenticate the user based on the bone conduction signal. In an embodiment, the system may utilize the pilot portion of the bone conduction signal to authenticate the user. In another embodiment, the system may utilize a combination of the pilot portion of the signal and characteristics of the received bone conduction signal. In such examples, if the characteristic of the received bone conduction signal match the pilot portion or other data stored in the system, then the system may authenticate the user. The system may transmit the authentication to the wearable or mobile device, thus enabling a user to continue to utilize the wearable or mobile device.

As noted, the method 500 may be iterated while the wearable or mobile device is in use and/or at various time intervals.

Figure 6A:
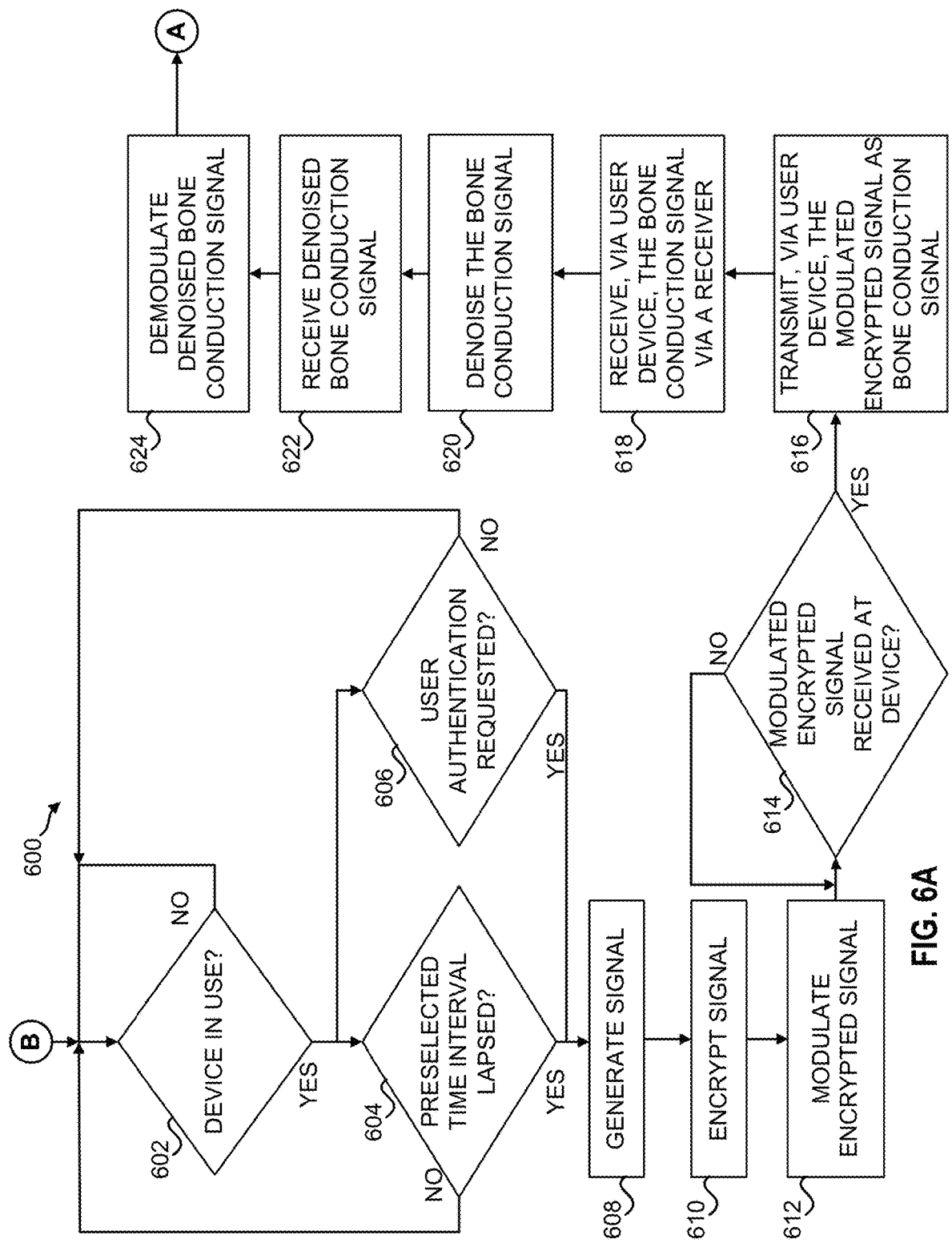
FIG. 6A and FIG. 6B are flow diagram of continuous, active, and/or non-intrusive user authentication, according to an embodiment of the present disclosure.
Figure 6B:
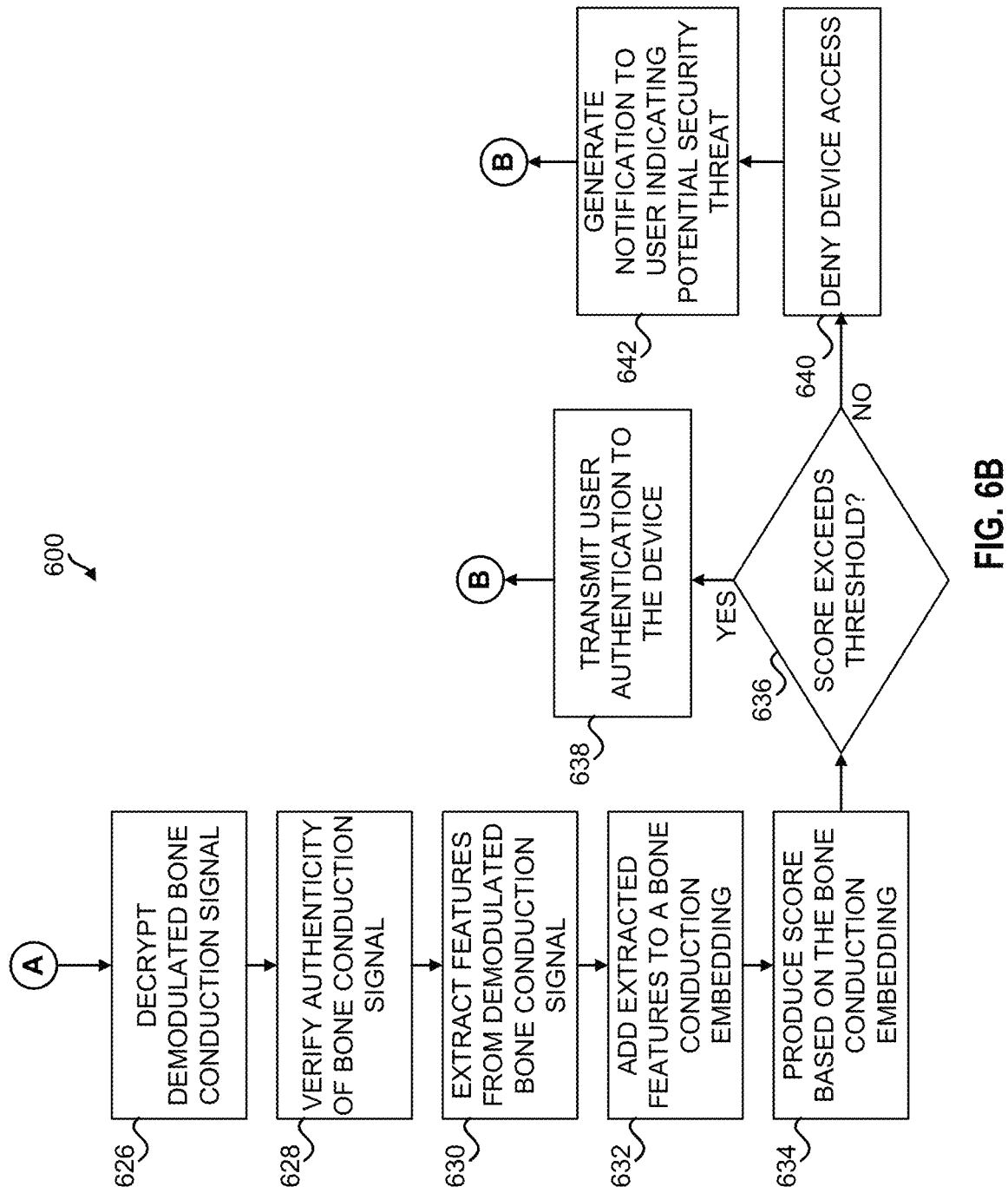

FIG. 6A and FIG. 6B are flow diagram of continuous, active, and/or non-intrusive user authentication, according to an embodiment of the present disclosure. It also will be understood that any of the Figs. described herein may implement the method 600, in particular FIGS. 1A-1D and 3. The method 600 may be included in one or more programs, protocols, or instructions loaded into memory of a computing device. The order in which the operations are described is not intended to be construed as a limitation, and any number of the described blocks may be combined in any order and/or in parallel to implement the disclosed methods At block 602, a system may determine whether a wearable or mobile device is in use. The system may determine that the wearable or mobile device is in use via reception of a signal indicating use of the wearable or mobile device. Further, a user may indicate that the wearable or mobile device is in use. In yet another embodiment, while the wearable or mobile device is in use, the operations described in relation to method 600 may be continuously, substantially continuously, or periodically performed.

At block 604, the system may determine whether a preselected time interval or period has lapsed. If the time period or interval has not lapsed, then system may determine whether the wearable or mobile device is still in use. Further, at block 606, the system may determine or check whether a user authentication request was received. If the time period or interval has lapsed or if user authentication has been requested, then the system, at block 608, may generate a signal. The system may include a waveform generator. The waveform generator may choose pilot data from a set of previously stored data relating or corresponding to the user. The waveform generator may add the pilot data to a subcarrier index. The waveform generator may also choose token data. The token data may include a user ID, a device ID, a timestamp, or randomly generated bits. The token data may also be added to a subcarrier index.

After signal generation, at block 610, the signal may be encrypted. The system may utilize one or more different encryption algorithms to encrypt the signal. For example, the system may retrieve a public key and encrypt the signal using the public key. The system may further generate a key and utilize the generated key to encrypt the signal. At block 612, the encrypted signal may be modulated as communication symbols (for example, the random bits may be converted or modulated to communication symbols transferable as a bone conduction or audio signal).

In an embodiment, the modulated encrypted signal may be sent or transmitted to one or more transmitters of the wearable or mobile device. The one or more transmitters may include bone conduction speakers configured to transmit the modulated encrypted signal as an inaudible signal, substantially inaudible signal, unnoticeable signal, or just unnoticeable signal (or some combination thereof). The one or more transmitters may be positioned within a user's ear canal. The one or more transmitters may transmit the bone conduction signal along a user's bone conduction pathway (for example, directly or via a cross-talk pathway) to one or more receivers. Thus, At block 614, the system and/or wearable or mobile device may determine whether the modulated encrypted signal has been received at the wearable or mobile device. Further, the wearable or mobile device may determine whether the one or more transmitters of the wearable or mobile device are properly positioned or positioned within a user's ear canal. Further still, the wearable or mobile device may determine whether the one or more receivers of the wearable or mobile device are properly positioned or positioned within a user's ear canal.

At block 616, the one or more transmitters may transmit the modulated encrypted signal as bone conduction signal. The bone conduction signal, as noted, may be recorded by the one or more receivers. In other words, at block 618, the one or more receivers may receive the bone conduction signal. Further, at block 620, the one or more receivers (or, in another embodiment, the system) may denoise the bone conduction signal. At block 622, the system may receive the denoised bone conduction signal. At block 624, the system may demodulate the denoised bone conduction signal.

At block 626, the system may decrypt the demodulated bone conduction signal. The type of decryption utilized may be based on the type of encryption utilized. For example, if a public key was used to encrypt the signal, a private key may be utilized to decrypt the bone conduction signal. In another example, if a one-time key is utilized, then the one-time key may be used for decryption.

At block 628, the system may verify the authenticity of a bone conduction signal based on the token portion of the bone conduction signal. If the token portion of the bone conduction matches the token portion of the original signal, then the system may verify that the bone conduction signal is authentic.

At block 630, the system may extract features from the received bone conduction signal and/or the pilot portion of the signal. Feature extraction may be performed via a convolutional neural network (CNN), another neural network, or other trained machine learning model or classifier. The CNN may leverage an image-classification method to extract image-like feature maps from using a time-frequency analysis. At block 630, the extracted features may be added or embedded in a bone conduction embedding or vector. At block 634, the system may generate or produce a score based on the bone conduction embedding or vector. The score may be generated or produced based on application of the bone conduction embedding or vector to a classifier or model.

At block 636, the system may determine if the score exceeds a threshold. If the score exceeds a threshold, then, at block 638, the system may transmit user authentication to the wearable or mobile device. If the score does not exceed the threshold, then, at block 640, the system may transmit a signal to the wearable or mobile device to deny access to the current user. At block 642, the system may generate a notification to the user indicating a potential security threat. Such a notification may be transmitted via a secondary communication associated with the user (for example, a phone number, and/or email, among other secondary communications).

In some embodiments, some of the operations above may be modified or further amplified. Furthermore, in some embodiments, additional optional operations may be included. Modifications, amplifications, or additions to the operations above may be performed in any order and in any combination.

This application is related to U.S. Provisional Application No. 63/268,999, filed Mar. 8, 2022, titled "SYSTEMS AND APPARATUS FOR MULTIFACTOR AUTHENTICATION USING BONE CONDUCTION AND AUDIO SIGNALS," U.S. Provisional Application No. 63/269,001, filed Mar. 8, 2022, titled "METHOD FOR MULTIFACTOR AUTHENTICATION USING BONE CONDUCTION AND AUDIO SIGNALS," and U.S. Provisional Application No. 63/380,229, filed Oct. 19, 2022, titled "SYSTEMS AND METHODS FOR CONTINUOUS, ACTIVE, AND NON-INTRUSIVE USER AUTHENTICATION," the disclosures of which are incorporated herein by reference in their entirety.

In the drawings and specification, several embodiments of systems and methods to provide two-way authentication for a user via a smart device or device and a wearable device have been disclosed, and although specific terms are employed, the terms are used in a descriptive sense only and not for purposes of limitation. Embodiments of systems and methods have been described in considerable detail with specific reference to the illustrated embodiments. However, it will be apparent that various modifications and changes can be made within the spirit and scope of the embodiments of systems and methods as described in the foregoing specification, and such modifications and changes are to be considered equivalents and part of this disclosure.

What is claimed is:

1. A system for non-intrusive device authentication for a user, the system comprising:
   a waveform generator engine configured to:
      generate a message, the message comprising a pilot portion and a token portion, and
      encrypt the message via a shared key to thereby generate an encrypted message;
   a wearable device including:
      one or more transmitters configured to emit the encrypted message as an unnoticeable message, and
      one or more receivers configured to:
         receive the unnoticeable message emitted from the one or more transmitters as a bone conduction signal, and
         cancel noise in the bone conduction signal;
   a decryption engine configured to:
      process the bone conduction signal from the one or more receivers to thereby generate a processed bone conduction signal,
      decrypt the processed bone conduction signal via the shared key to thereby generate a decrypted bone conduction signal, and
      separate a bone conduction token portion from the decrypted bone conduction signal; and
   an authentication engine configured to:
      analyze the bone conduction signal,
      in response to a comparison of the analyzed bone conduction signal and the pilot portion exceeding a preselected threshold, authenticate a user, and
      verify bone conduction signal authenticity via the bone conduction token portion and the token portion.

2. The system of claim 1, wherein the non-intrusive device authentication occurs iteratively, and wherein each iteration occurs sequentially and substantially simultaneously.

3. The system of claim 1, wherein a request for non-intrusive device authentication occurs at any time.

4. The system of claim 1, further comprising a computing device, and wherein the computing device comprises the waveform generator engine, the decryption engine, and the authentication engine.

5. The system of claim 4, wherein the computing device includes the shared key, and wherein the waveform generator engine and the decryption engine access the shared key via internal signal communication.

6. The system of claim 1, wherein noise cancelled from the bone conduction signal includes human activity and other activity, wherein the human activity includes speech, footsteps, respiration, or noise generated by dental articulation or other user movement, and wherein the other activity includes noise generated by music, speech from other sources, or background noise.

7. The system of claim 1, wherein the waveform generator engine and the decryption engine utilize a Rivest-Shamir-Adleman (RSA) based algorithm to obtain the shared key for encryption and decryption.

8. The system of claim 1, wherein the pilot portion comprises data corresponding to a user's initializing bone conduction signal.

9. The system of claim 8, wherein the initializing bone conduction signal comprises one or more previously analyzed bone conduction signals.

10. The system of claim 1, wherein the pilot portion comprises a Zadoff-Chu sequence along one or more subcarriers of a carrier of the encrypted message.

11. The system of claim 10, wherein the pilot portion fills the one or more subcarriers.

12. The system of claim 1, wherein the token portion comprises one or more of a user identification, a device identification, a timestamp, or random bits.

13. The system of claim 1, wherein the waveform generator engine is further configured to modulate the encrypted message prior to transmission.

14. The system of claim 13, wherein modulation comprises a differential phase shift keying (DPSK) algorithm.

15. The system of claim 14, wherein the waveform generator is further configured to, after modulation of the encrypted message, convert the modulated encrypted message into a time domain waveform via an inverse Fourier transform (IFFT).

16. The system of claim 1, wherein the one or more transmitters comprise bone conduction speakers.

17. The system of claim 16, wherein the one or more receivers comprise in-ear microphones.

18. The system of claim 17, wherein the one or more transmitters comprises a plurality of transmitters, and wherein the plurality of transmitters are configured to transmit the encrypted message via one or more of alternating transmissions, random transmission, or simultaneous transmission.

19. The system of claim 18, wherein the one or more receivers comprises at least two receivers, wherein one receiver is positioned in a contralateral ear canal and another receiver is positioned in an ipsilateral ear canal, and wherein, during transmission of the encrypted message, the one receiver and the another receiver are configured to receive the encrypted message as the bone conduction signal.

20. The system of claim 1, wherein the encrypted message comprises a message transmitted as one or more of an ultra-high frequency or an ultra-low frequency.

21. The system of claim 20, wherein the ultra-high frequency comprises a range of about 16 kHz to about 48 kHz.

22. The system of claim 21, wherein the ultra-high frequency comprises a signal at about 48 kHz.

23. The system of claim 20, wherein the ultra-high frequency comprises an ultrasound signal.

24. The system of claim 20, wherein the ultra-low frequency comprises a signal at about 20 Hz to about 200 Hz.

25. The system of claim 1, wherein the decryption engine processes the bone conduction signal by one or more of filtering, denoising, segmenting, or normalizing the bone conduction signal.

26. The system of claim 25, wherein authentication is further based on a score exceeding a threshold, the authentication engine configured to generate the score by applying a classifier generated by a machine learning model to the bone conduction signal.

27. A system for non-intrusive device authentication, the system comprising:
a waveform generator configured to, in response to detection of operation of a user's device:
generate a message, the message comprising a pilot portion and a token portion,
encrypt the message via a shared key to thereby generate an encrypted message, and
transmit the encrypted message to one or more transmitters corresponding to the user's device;
a decryption engine configured to:
receive a bone conduction signal from one or more receivers, the one or more receivers to receive the encrypted message as the bone conduction signal from the one or more transmitters,
process the bone conduction signal to thereby generate a processed bone conduction signal,
decrypt the processed bone conduction signal via the shared key to thereby generate a decrypted bone conduction signal, and
separate a bone conduction token portion from the decrypted bone conduction signal; and
an authentication engine configured to:
analyze the bone conduction signal,
in response to a comparison of the analyzed bone conduction signal and the pilot portion exceeding a preselected threshold, authenticate a user for the operation detected, and
verify bone conduction signal authenticity via the bone conduction token portion and the token portion.

28. The system of claim 27, wherein analysis of the bone conduction signal comprises the authentication engine configured to:
extract features via a trained neural network;
add extracted features to a bone conduction embedding;
evaluate the bone conduction embedding to produce a score; and
in response to the score exceeding a preselected, authenticate user operation of the device.

29. The system of claim 27, wherein authentication of the user and verification of the bone conduction signal's authenticity occurs substantially simultaneously.

30. A method for non-intrusive authentication of a user, the method comprising:
generating a waveform, the waveform to include a pilot portion and a token portion;

encrypting the waveform via a shared key to generate an encrypted waveform;

modulating, via one or more preselected frequencies, the encrypted waveform to generate a modulated encrypted waveform;

transmitting the modulated encrypted waveform to one or more transmitters associated with the user to be authenticated;

transmitting the modulated encrypted waveform from the one or more transmitters as a bone conduction signal;

receiving the bone conduction signal at one or more receivers;

denoising the bone conduction signal;

demodulating the bone conduction signal via the one or more preselected frequencies;

decrypting the demodulated bone conduction signal via the shared key;

verifying authenticity of the decrypted demodulated bone conduction signal based on the token portion; and authenticating the user based on the pilot portion.

31. The method of claim 30, wherein a smart device comprises the one or more transmitters and the one or more receivers.

32. The method of claim 31, further comprising, upon authentication of the user and verification of the bone conduction signal, allowing the user to one or more of (a) access or utilize the smart device, (b) access data on the smart device, or (c) continue to use the smart device.

33. The method of claim 31, further comprising, upon authentication of the user and verification of the bone conduction signal, allowing the user to (a) access or utilize the smart device and (b) access data on the smart device associated with the user.

34. The method of claim 31, further comprising, upon authentication of the user and verification of the bone conduction signal, allowing the user to (a) access or utilize the smart device and (b) access personal data on the smart device associated with the user.

35. A method for non-intrusive authentication of a user, the method comprising:

during operation of a smart device by the user substantially continuously and iteratively:

generating a waveform, the waveform comprising a pilot portion and a token portion;

encrypting the waveform via a shared key to generate an encrypted waveform;

modulating, via one or more preselected frequencies, the encrypted waveform to generate a modulated encrypted waveform;

transmitting the modulated encrypted waveform to one or more transmitters associated with the user to be authenticated;

receiving a bone conduction signal from one or more receivers associated with the user to be authenticated;

removing interference from the bone conduction signal;

demodulating the bone conduction signal via the one or more preselected frequencies;

decrypting the demodulated bone conduction signal via the shared key;

verifying authenticity of the decrypted demodulated bone conduction signal based on the token portion;

analyzing the bone conduction signal; and authenticating the user based on the pilot portion and the analyzed bone conduction signal.

36. The method of claim 35, wherein decrypting the demodulated bone conduction signal additionally occurs via a private key.

* * * * *